(12) United States Patent
Bagley (10) Patent No.: US 10,201,249 B2
(45) Date of Patent: Feb. 12, 2019

(54) SLICER

(71) Applicant: Progressive International Corporation, Kent, WA (US)

(72) Inventor: Justin Bagley, Seattle, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 66 days.

(21) Appl. No.: 14/606,899

(22) Filed: Jan. 27, 2015

(65) Prior Publication Data

US 2015/0208870 A1    Jul. 30, 2015

Related U.S. Application Data

(60) Provisional application No. 61/932,647, filed on Jan. 28, 2014.

(51) Int. Cl.
| | |
|---|---|
| B26B 27/00 | (2006.01) |
| B26B 29/00 | (2006.01) |
| B26D 1/04 | (2006.01) |
| A47J 43/28 | (2006.01) |
| B26D 1/06 | (2006.01) |
| B26D 3/26 | (2006.01) |
| B26D 3/30 | (2006.01) |

(52) U.S. Cl.
CPC .............. *A47J 43/28* (2013.01); *B26B 27/00* (2013.01); *B26B 29/00* (2013.01); *B26D 1/06* (2013.01); *B26D 3/26* (2013.01); *B26D 3/30* (2013.01)

(58) Field of Classification Search
CPC ............ B26B 27/00; B26B 29/00; B26D 1/04

USPC ... 30/282–286, 290, 114–117, 280, 294, 295
See application file for complete search history.

(56) References Cited

U.S. PATENT DOCUMENTS

| | | | | |
|---|---|---|---|---|
| 1,639,026 | A * | 8/1927 | Diehl | A22C 17/14 |
| | | | | 30/290 |
| 2,520,000 | A * | 8/1950 | Dettman | B26D 3/30 |
| | | | | 30/124 |
| 4,001,934 | A * | 1/1977 | Bell | G07D 9/00 |
| | | | | 30/124 |
| 4,106,196 | A * | 8/1978 | Smithline | B26B 27/00 |
| | | | | 30/286 |
| 4,459,745 | A * | 7/1984 | Britton | H02G 1/1217 |
| | | | | 30/90.4 |
| 4,557,053 | A * | 12/1985 | Hadley, Jr. | B26D 3/185 |
| | | | | 30/114 |
| 4,580,343 | A * | 4/1986 | Bell, Jr. | B26B 29/063 |
| | | | | 269/3 |
| 4,841,640 | A * | 6/1989 | Daniels | B26B 29/02 |
| | | | | 30/123.5 |
| 4,896,422 | A * | 1/1990 | Sheehan | A01K 97/00 |
| | | | | 30/290 |
| 4,976,029 | A | 12/1990 | Kennedy | |
| 5,353,507 | A * | 10/1994 | Lee | B26B 5/00 |
| | | | | 30/280 |

(Continued)

*Primary Examiner* — Sean Michalski
*Assistant Examiner* — Fernando Ayala
(74) *Attorney, Agent, or Firm* — Lowe Graham Jones PLLC (57) ABSTRACT

A slicer includes a tubular main body having a handle, with a first open end and a second closed end. A slicer grip includes an interior blade and a shape that mates with the tubular main body. The grip is configured to allow the blade to extend into the tubular main body and to pass along the length of the tubular main body to slice items contained within the tubular main body.

11 Claims, 6 Drawing Sheets

(56) References Cited

U.S. PATENT DOCUMENTS

| | | | | |
|---|---|---|---|---|
| 5,431,078 A * | 7/1995 | Ricard | ............... | B26B 29/063 |
| | | | | 83/454 |
| 5,561,903 A * | 10/1996 | Bourbeau | ............ | H02G 1/1217 |
| | | | | 30/280 |
| 5,771,771 A * | 6/1998 | Gagliardi, Jr. | ............ | B26D 3/08 |
| | | | | 83/620 |
| 6,029,355 A * | 2/2000 | Carlin | ................. | B26D 3/001 |
| | | | | 30/287 |
| 6,247,235 B1 * | 6/2001 | Lawler | ............... | H02G 1/1229 |
| | | | | 30/90.1 |
| 7,861,727 B1 * | 1/2011 | Jones | ................. | A24F 13/26 |
| | | | | 131/253 |
| D692,734 S | 11/2013 | Kent | | |
| 8,584,565 B1 * | 11/2013 | Hortelius | ............... | A22C 11/00 |
| | | | | 30/124 |
| D729,597 S | 5/2015 | Bagley | | |
| 2002/0100173 A1 * | 8/2002 | Suer | ................. | B26B 3/04 |
| | | | | 30/114 |
| 2009/0049698 A1 * | 2/2009 | Drake | ............... | A61M 25/0668 |
| | | | | 30/282 |
| 2011/0078906 A1 | 4/2011 | George | | |
| 2012/0111169 A1 * | 5/2012 | Blalock | ................. | B26B 3/08 |
| | | | | 83/614 |
| 2015/0197025 A1 * | 7/2015 | Spae | ................. | B26B 3/04 |
| | | | | 30/114 |

* cited by examiner

SLICER

PRIORITY CLAIM

This application claims priority to U.S. Provisional Application No. 61/932,647 filed Jan. 28, 2014, the contents of which are incorporated by reference.

FIELD OF THE INVENTION

The present invention is directed to devices for slicing food items, particularly including small fruits and vegetables such as grapes and cherry tomatoes.

BACKGROUND OF THE INVENTION

Small fruits, particularly including cherry tomatoes, can be very difficult to slice. Their small size makes them difficult to hold, creating the possibility of an injury when trying to handle them with one hand while slicing them with the other. Tomato skins can also be challenging to pierce initially, sometimes causing the tomato to roll or move in a way that can make cutting dangerous. When great care is taken to reduce the risk, the cutting process can consume quite a lot of time.

SUMMARY OF THE INVENTION

A preferred slicer includes a tubular main body having a handle. In accordance with various versions of the invention, the tubular main body may have a variety of shapes, such as cylindrical or tear-drop.

The main slicer body is open at a first end and closed at an opposite second end. A channel is formed in an upper sidewall of the main body along the entire length from the first end to the second end. The channel continues through the second closed end and thereby bifurcates the closed end into two halves so that a blade can pass through the closed end but an item within the main body will be retained.

In some versions, a handle is positioned on the main body at a location diametrically opposite the channel.

A slicer grip is configured with a shape that allows the slicer grip to snugly surround the outer sidewalls of the main body and to slide along the outside of the main body.

A blade is mounted in the slicer grip within the interior volume defined by the sidewall forming the slicer grip. In a preferred example, the blade is positioned so that it can be received within the channel defined in the main body.

The blade within the slicer grip preferably includes a sharpened edge, with the sharpened edge being inclined toward the trailing edge of the slicer grip as it extends away from the sidewall of the slicer grip where it is attached, terminating in an angle of the triangle at the opposite end.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 8:
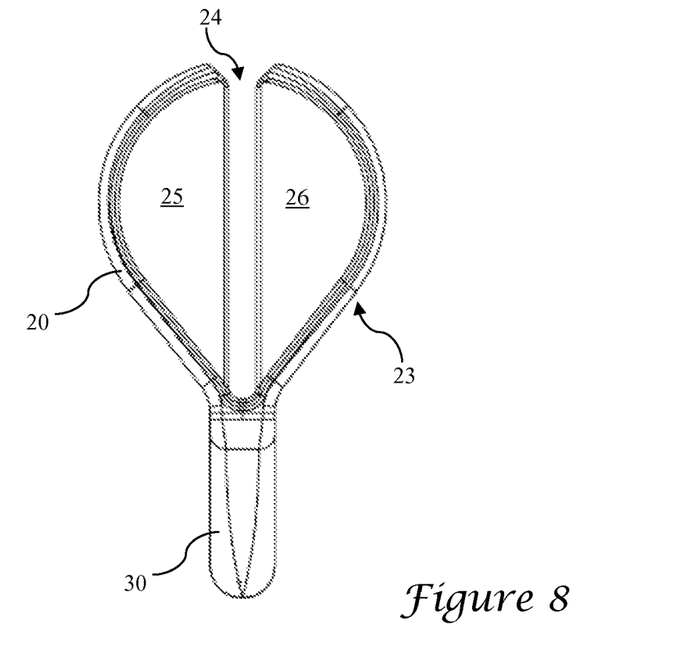
FIG. 8 is an end view of a preferred slicer main body.

With reference to the figures, a slicer 10 includes a tubular main body 20 having a handle 30. The main body includes a first open end 22 and an opposing substantially closed and 23. In a preferred version, the tubular main body is substantially cylindrical as it extends from the first open end to the second closed end. A channel 24 is formed in an upper sidewall of the main body along the entire length from the first end to the second end. The channel continues through the second closed end 23 and thereby bifurcates the closed end into two halves 25, 26 (see FIG. 8) to form the substantially closed end 23. In this fashion, the second end is formed with a wall to make it "closed" in the sense that it includes an end wall that will prevent tomatoes from passing through, but which also includes a channel extending through it to allow the blade to pass through the closed end.

In the illustrated version, the handle 30 is positioned on the main body at a location diametrically opposite the channel 24. Thus, both the handle and the channel extend linearly along the entire length of the main body. While a handle extending along the entire length is preferred, in other versions the handle may be shorter than the entire length of the main body. Likewise, in some examples of the invention it may be possible to move the handle to other locations, particularly including locations that are offset somewhat from a position diametrically opposite the channel 24.

Figure 1:
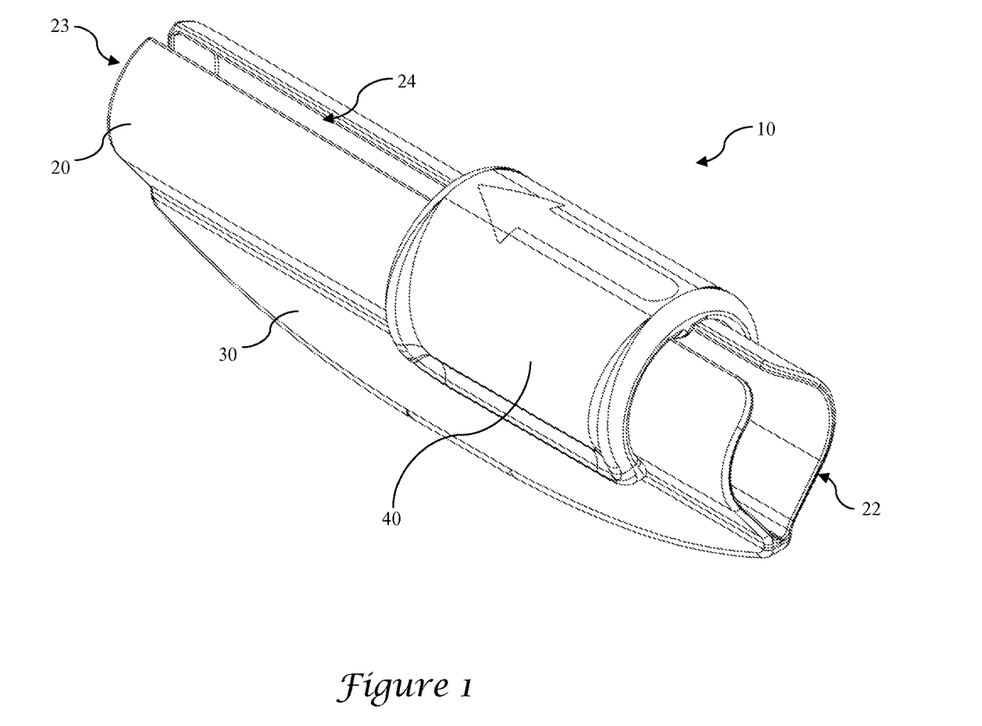
FIG. 1 is a perspective view of a preferred slicer.
Figure 6:
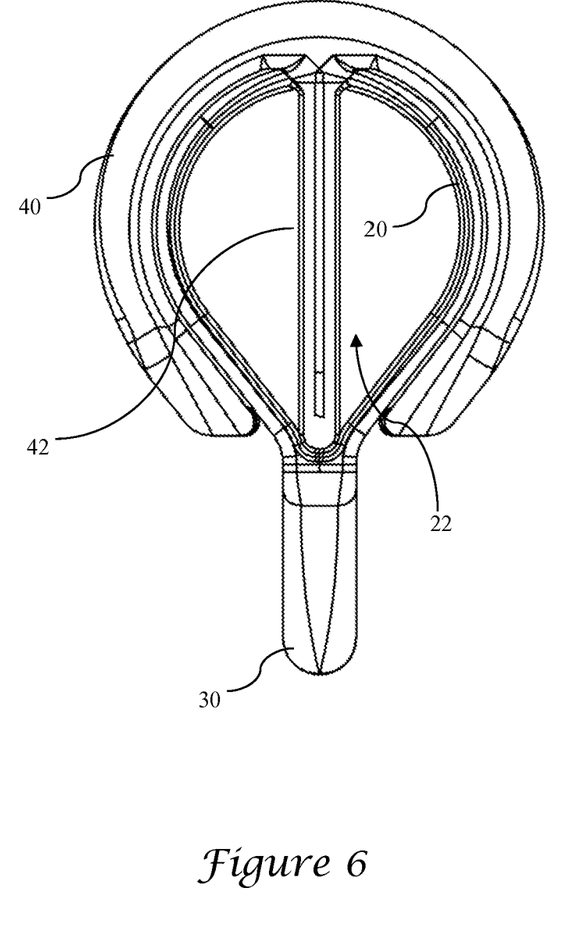
FIG. 6 is an end view of a preferred slicer, showing a left side view of the slicer of FIG. 4.

Although the main body is described above as having a substantially tubular shape that may form a cylinder, in a preferred version of the invention the main body is formed with a teardrop shape as seen in the end view such as best seen in FIG. 6. The teardrop shape is formed through a sectional plane of the tubular main body, in which the section is taken along a plane that is perpendicular to an axis that is parallel to the axis formed by the main body channel 24. In other words, when looking into the open interior of the main body from the first end 22 toward the second end 23 (best seen in FIG. 1) the shape defined by the interior sidewalls of the main body forms a teardrop shape in which the bulbous rounded end is positioned along the upper channel 24 and the pointed end of the teardrop is positioned diametrically opposite, adjacent the lower handle 30. Regardless of the cross-sectional shape, the main body is formed as an elongated structure that is substantially enclosed along its length and at one end in order to define an interior space, with an opposing open end and a channel extending along its length and through the closed end.

Figure 2:
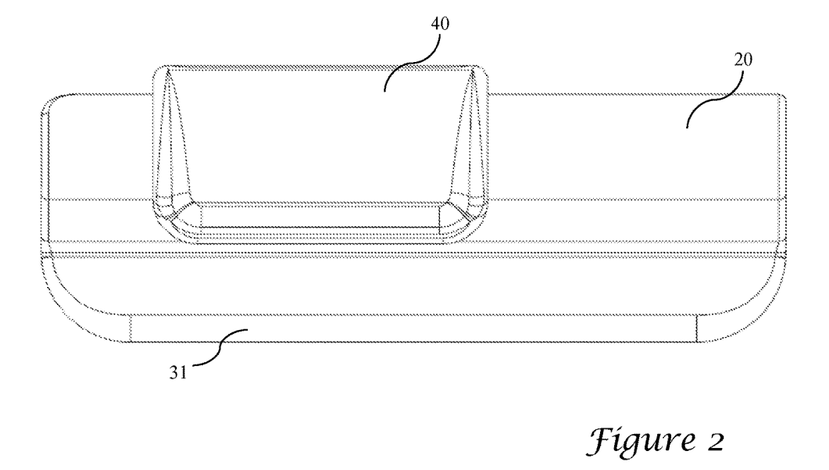
FIG. 2 is a front plan view of a preferred slicer.
Figure 3:
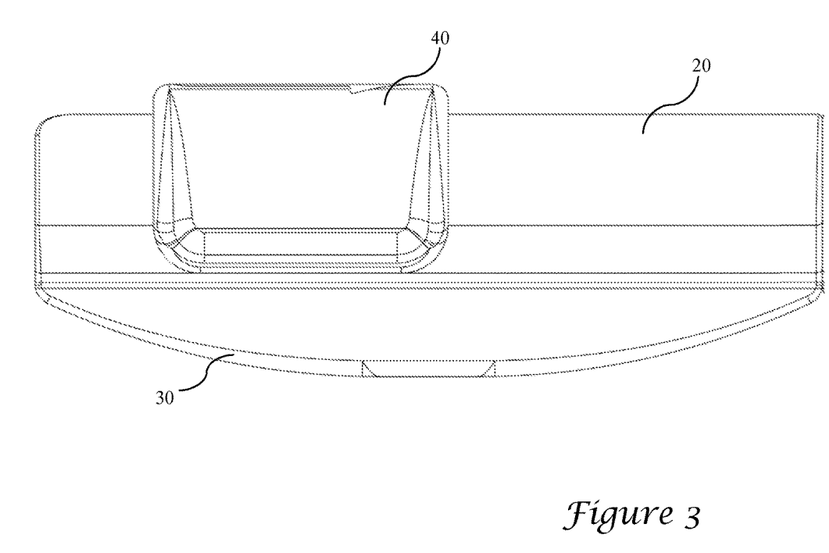
FIG. 3 is a front plan view of an alternate version of a preferred slicer.
Figure 4:
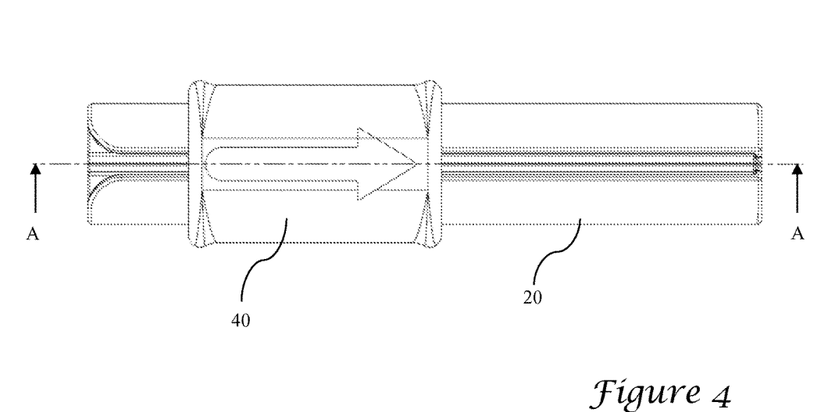
FIG. 4 is a top plan view of a preferred slicer.
Figure 5:
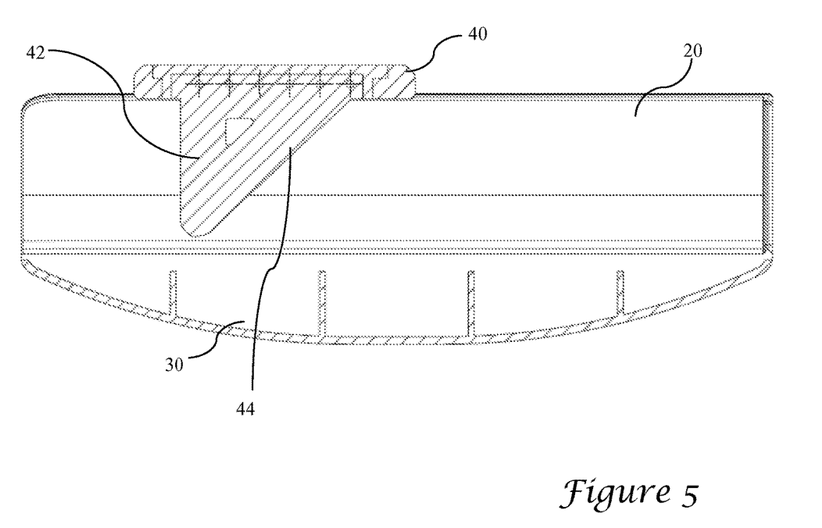
FIG. 5 is a sectional view of a preferred slicer, taken along line A-A of FIG. 4.

As best seen in FIGS. 2 and 3, two different handle shapes are shown. In the first version shown in FIG. 2, the handle 31 extends outwardly from the main body substantially along its entire length in a half-oblong shape, that is, a rectangle with rounded lower corners. In a second version shown in FIG. 3, the handle 30 also extends along the entire length of the main body, but in this alternate configuration it is rounded along substantially the entire length, forming a half-oval shape.

In each of the illustrated versions of the handles, the handles 30, 31 are solid, with no openings formed between the handle and the main body. This configuration provides a larger grasping surface for holding the main body while inserting tomatoes and slicing them. In other versions, although less desired, the handle may include an opening allowing fingers to be inserted through the opening.

Figure 7:
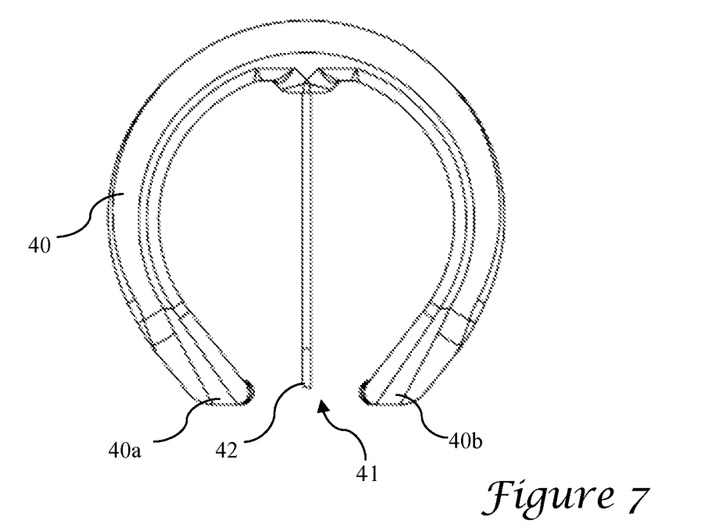
FIG. 7 an end view of a preferred slicer grip and blade.

A slicer grip 40 is configured with a shape that allows the inner surface of the slicer grip to snugly surround the outer sidewalls of the main body 20. Thus, the slicer grip is formed as a tubular body having openings at each end 40c, 40d (see FIG. 9) and having a channel 41 formed through the sidewall defined by sidewall edges 40a, 40b (see FIG. 7), with the channel extending along the entire length from the first end to the second end. In a version of the invention in which the main body is formed with a teardrop shape, the slicer grip is likewise formed with a mating teardrop shape. In the illustrated version, the slicer grip includes sidewalls extending around nearly all of the main body. The channel 41 formed in the slicer grip is positioned at the pointed end of the teardrop shape and is sized such that the handle 30 of the main body 20 can pass through and slide along the channel 41 formed in the slicer grip 40. The handle, or at least an outwardly extending flange in the position of the handle, can thereby serve as a guide to keep the blade aligned and prevent the slicer grip from rotating in a circular direction as it slides along the main body.

A blade 42 is mounted in the slicer grip within the interior volume defined by the sidewall forming the slicer grip. In a preferred version, the blade is positioned at the apex of the teardrop shape defined by the slicer grip, with the blade extending in a direction toward the channel 41 formed in the slicer grip. As such, the blade 42 bifurcates the interior space. Likewise, the blade is positioned so that it can be received within the channel 24 defined in the main body, and the bifurcated interior space of the slicer grip is sized such that the bifurcated sides 25, 26 of the main body can fit within and slide along a respective one of the two bifurcated interior spaces within the slicer grip.

The blade within the slicer grip preferably includes a sharpened edge 44, with the sharpened edge being inclined toward the trailing edge of the slicer grip as it extends away from the sidewall of the slicer grip where it is attached, terminating in an angle of the triangle at the opposite end. The end of the blade opposite the sharpened edge preferably extends perpendicularly away from the sidewall of the slicer grip.

Figure 9:
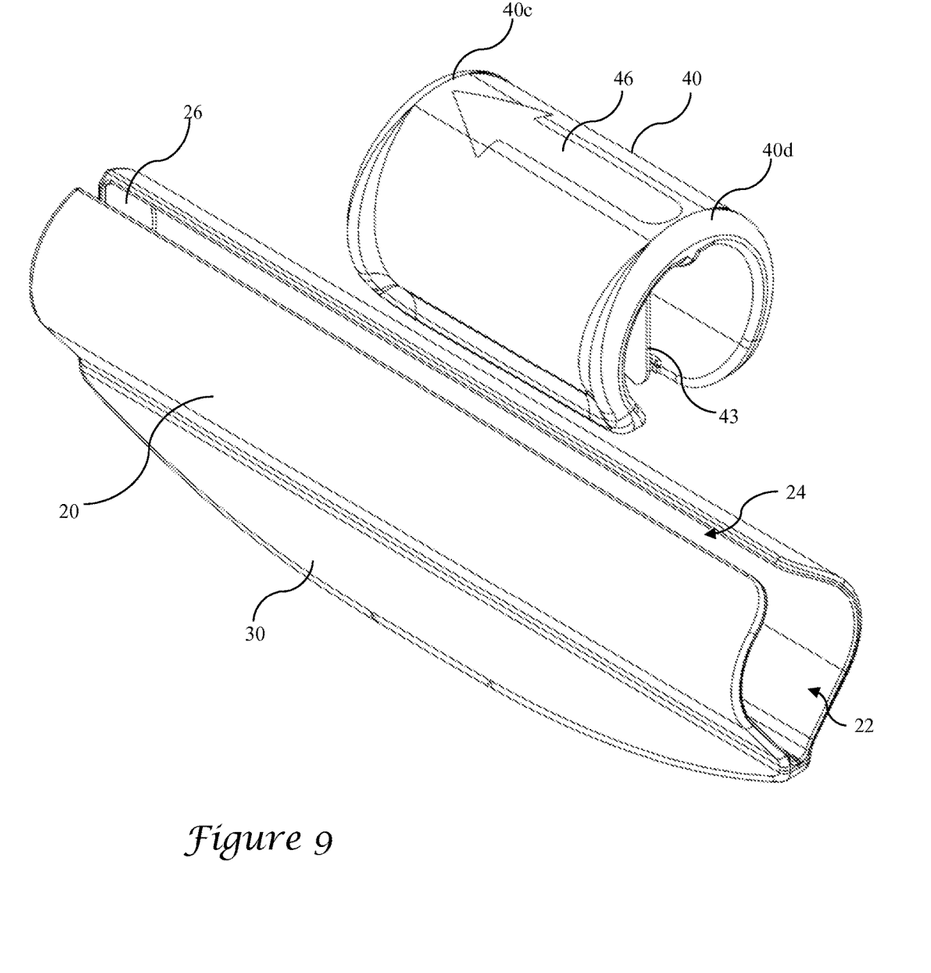
FIG. 9 is an exploded view of a preferred slicer main body and slicer grip.

In one version of the invention, the slicer grip includes an arrow 46 or other indicator pointing toward the sharpened edge of the blade and away from the dull edge of the blade 43, as best seen in FIG. 9. Likewise, the arrow therefore points in the direction in which the slicer grip should be moved in order to slice through tomatoes or other objects within the main body. In other versions of the invention, the blade may have opposing sharpened edges, without a dull edge, so that the slicer grip may be used in either direction.

In accordance with a preferred version of the invention, the corners of the main body adjacent the open end 22 are rounded to provide a flared opening. The rounded corners and slightly flared opening allow for easier insertion of the blade as the slicing grip is attached to the main body.

In use, several cherry tomatoes (or other food items) are placed within the main body in preparation for slicing. At the time of insertion, the slicer grip is wholly removed from the main body. In a preferred version of the invention, the main body is formed with a length (between the first end 22 and the second end 23) of between 4 inches and 8 inches in order to accommodate several cherry tomatoes at one time. Once the tomatoes are inserted into the slicer, a first end of the slicer grip (that is, the end adjacent the sharpened edge of the blade) is positioned against the open end 22 of the main body. The main body is inserted into the slicer grip with the outer sidewalls of the main body being positioned against the inner sidewalls of the slicer grip. Likewise, the blade of the slicer grip will be received within the channel 24 of the main body. With the slicer grip in place, a user moves the slicer grip along the length of the main body, with the slicing blade traveling through the main body and thereby slicing the cherry tomatoes (or other fruits or vegetables) in half as it slices along the interior of the main body. Because the channel 24 extends along the entire length of the main body including through the end wall 23, slicing grip can be mounted to the first end of the main body, slid along its entire length, and removed from the main body at the opposite end. After the tomatoes are sliced in half, the main body is tipped on end to allow the sliced halves to fall out of the open end of the main body.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A slicer, comprising:
   a tubular main body formed by a sidewall defining an interior space, the tubular main body having an open first end and an end wall defining a partially closed second end, the main body being elongated between the first end and the second end;
   a main body channel formed on the sidewall and extending along the length of the tubular main body from the first end to the second end, the main body channel extending through the end wall and bifurcating the end wall into two portions;
   a flange extending outwardly from the main body sidewall; and
   a slicer grip having an inner surface and an outer surface, the inner surface of the slicer grip being configured to receive and surround the sidewall of the tubular main body to retain the tubular main body within the slicer grip, the slicer grip further comprising a blade extending from the inner surface of the slicer grip;
   whereby the blade extends through the main body channel and into the interior space of the tubular main body when the sidewall of the tubular main body is received within the slicer grip; and further wherein the flange provides a guide for the slicer grip and is grippable as a handle for a user when the slicer grip slides along the length of the main body; and further wherein the main body channel is configured to allow the blade to travel along the main body channel from the first end to the second end, between the two portions of the end wall, and beyond the end wall.

2. The slicer of claim 1, wherein the slicer grip further comprises a first open grip end and a second open grip end, a grip channel extending along a length of the slicer grip from the first open grip end to the second open grip end, whereby the inner surface of the slicer grip is configured to allow the tubular main body to pass into the first open grip end, through the slicer grip, and out the second open grip end, wherein the main body is removed from the slicer grip after sliding out the second open grip end.

3. The slicer of claim 1, wherein the flange extends from the main body at a location diametrically opposite the main body channel.

4. The slicer of claim 1, wherein the tubular main body forms an axis parallel to the main body channel, the sidewall defining the interior space being formed with a teardrop shape along a cross section perpendicular to the axis.

5. The slicer of claim 4, wherein the teardrop shape comprises a bulbous end and a pointed end, and further wherein the main body channel is positioned at the bulbous end and the flange is positioned at the pointed end.

6. The slicer of claim 1, further comprising an indicator on an outer surface of the slicer grip, the indicator providing an indication of the orientation of a sharpened end of the blade.

7. A slicer, comprising:
- a main body formed by a sidewall defining an interior space, the main body having an open first end and an end wall defining a partially closed second end, the main body being elongated between the first end and the second end;
- a main body channel formed on the sidewall and extending along the length of the main body from the first end to the second end, the main body channel further extending through the end wall of the closed second end;
- a main body flange positioned on an outer portion of the sidewall of the main body, the main body flange extending radially away from the main body from a location diametrically opposite the main body channel; and
- a slicer grip configured to surround the main body within the slicer grip for lateral sliding motion of the slicer grip along the main body from the first end to the second end of the main body, the slicer grip further having a slicer grip channel defined by slicer grip edges, the slicer grip channel being configured to engage the main body flange, wherein the main body flange extends through the slicer grip channel and projects outward between the slicer grip edges when the slicer grip slides along the main body from the first end to the second end; and
- a blade attached to the slicer grip, the blade extending through the main body channel and into the interior space of the tubular main body when the sidewall of the tubular main body is received within the slicer grip; and
wherein the main body channel is configured to allow the blade to pass through the end wall of the partially closed second end.

8. The slicer of claim 7, wherein the main body flange is configured as a handle.

9. The slicer of claim 7, wherein the main body forms an axis parallel to the main body channel, the sidewall defining the interior space being formed with a teardrop shape along a cross section perpendicular to the axis.

10. The slicer of claim 9, wherein the teardrop shape comprises a bulbous end and a pointed end, and further wherein the main body channel is positioned at the bulbous end and the flange is positioned at the pointed end.

11. The slicer of claim 7, further comprising an indicator on an outer surface of the slicer grip, the indicator providing an indication of the orientation of a sharpened end of the blade.

* * * * *